United States Patent [19]

Kozakiewicz

[11] Patent Number: 4,614,784

[45] Date of Patent: Sep. 30, 1986

[54] HOMOGENEOUS MOLECULAR COMPOSITES, PROCESS FOR THEIR PRODUCTION AND ARTICLES MADE THEREFROM

[75] Inventor: Joseph J. Kozakiewicz, Wallingford, Conn.

[73] Assignee: American Cyanamid Company, Stamford, Conn.

[21] Appl. No.: 597,562

[22] Filed: Apr. 6, 1984

[51] Int. Cl.[4] .............................................. C08G 1/00
[52] U.S. Cl. .................................. 527/313; 527/314; 527/315
[58] Field of Search ...................... 527/313, 314, 315

[56] References Cited

U.S. PATENT DOCUMENTS

| 3,372,132 | 3/1968 | Cruz ...................................... 527/315 |
| 4,207,407 | 6/1960 | Helminiak et al. .................. 525/425 |
| 4,377,546 | 3/1983 | Helminiak et al. .................. 525/425 |

FOREIGN PATENT DOCUMENTS 2008598  9/1982  United Kingdom .

OTHER PUBLICATIONS

Helminiak, Wellman, Hwang, Wiff, Rodgers & Benner, "Air Force Wright Aeronautical Lab Report", AF-WAL-TR-80-4163, Jan. to Sep. 1980, dated Feb. 81, 79 pages.

Husman, Helminiak & Adams, "Molecular Composites", Feb. 1980.

Kiss, Kovacs & Wittmann, "In situ Polymerization in Binding Polymer/Monomer Mixtures", Journal of Applied Polymer Science (1981).

Hwang, Wiff, Verschoore, Price, Helminiak & Adams, "Solution Processing & Prop. of Molecular Composite Fibers & Films", Polymer Eng. & Science, Oct. 1983, vol. 23, No. 14.

Tsutsui & Tanaka, J. Polym. Sci. Polym. Lett. Ed., 15 pp. 475–478 (1977).

Tsutsui, R. Tanaka & T. Tanaka, J. Polym. Sci. Polym. Lett. Ed., 17, pp. 511–520 (1979).

Tsutsui & Tanaka, J. Polym. Sci. Polym. Lett. Ed., 18, pp. 17–23 (1980).

*Primary Examiner*—James J. Bell
*Attorney, Agent, or Firm*—William H. Calnan

[57] ABSTRACT

Molecular composites, liquid crystalline and isotropic, comprising (i) an in situ polymerized flexible coil-like polymer and (ii) a reinforcing amount of a rigid rod-like liquid crystalline polymer. Articles made from such molecular composites have mechanical properties enhanced in three dimensions.

34 Claims, No Drawings

HOMOGENEOUS MOLECULAR COMPOSITES, PROCESS FOR THEIR PRODUCTION AND ARTICLES MADE THEREFROM

FIELD OF THE INVENTION

The present invention relates to homogeneous polymer alloys in which a matrix of a polymer having flexible polymer chains is reinforced by a polymer having rigid chains. More particularly, it relates to molecular composites comprising (i) an in situ polymerized flexible coil-like polymer and (ii) a reinforcing amount of a rigid rod-like liquid crystalline polymer. Articles made from such molecular composites have mechanical properties enhanced in three dimensions.

BACKGROUND OF THE INVENTION

Molecular composites, which are blends of random-coil polymers reinforced by rigid-rod polymers, are known to possess properties superior to traditional fiber reinforced composites possessing the same weight fraction of reinforcing fiber. See, for example, Prevorsek, Polymer Liquid Crystals, Ed. by Ciferri, Krigbaum and Meyer, Academic Press, 1982, 361-376, who surveys the field of molecular reinforcement. Such composites lend themselves to the production of high strength workpieces suitable for high temperature environments. Among the techniques known for the preparation of such composites are extrusion and solution casting, but both have limitations which have prevented the preparation of homogeneous molecular composites with random or liquid crystalline orientation. Takayanagi and Kajiyama, U.K. Pat. GB No. 2,008,598B produced alloys of less than 20% of rigid rod-like homopolymers as well as blocks and grafts of rigid rod-like copolymers and greater than 80% of flexible coil-like polymers by blending solvent solutions, removing the solent, and hot pressing, and also by co-extrusion. Such techniques were also employed by Kanakalatha, Vijayan, Sridhar and Singh, Polymer, 1983, Vol. 24, May, pp. 621-625; and by Takayanagi, Ogata, Morikawa and Kai, J. Macromol. Sci-Phys., B17(4), pp. 591-615 (1980). Helminiak, Benner, Arnold and Husman, U.S. Pat. No. 4,207,407 and U.S. Pat. No. 4,377,546, disclose rod-like aromatic heterocyclic polymers used as reinforcements in coil-like heterocyclic polymer matrices to provide polymers at the molecular level that are analogous to chopped fiber composites. These are produced by blending dilute solutions of the respective polymers in methanesulfonic acid and removing the solvent from the polymer solution or by precipitating from solution by exposure to a moist atmosphere. Modifications, phase diagrams and properties of such polymer composites are given, inter alia, in Helminiak, Wellman, Hwang, Wiff, Rogers and Benner, Air Force Wright Aeronautical Laboratories Report, AFWAL-TR-80-4163, January 1980 to September 1980, dated February 1981, 79 pages; Helminiak, Hwang, Wiff, Benner and Price, Air Force Wright Aeronautical Laboratories Report, AFWAL-TR-82-4039, January 1980-August 1981, dated October 1982, 57 pages; Husman, Helminiak, Adams, Wiff and Benner, Molecular Composites (1980), 16, pp. 203-214; Hwang, Wiff, Benner and Helminiak, J. Macromol. Sci.-Phys. B22(2), 231-257 (1983); Hwang, Wiff, Helminiak and Adams, A.C.S. Organic Coatings and Applied Polymer Proceedings, 48, 929 (1983); Hwang, Wiff, Verschoore, Price, Helminiak and Adams, Polymer Engineering and Science, Mid-Octover 1983, Vol. 23, No. 14, pp. 784-788 (in which such solutions have also been extruded as fibers or films into coagulation baths); and Hwang, Wiff and Verschoore, Polymer Engineering and Science, Mid-October 1983, Vol. 23, No. 14, pp. 789-791. With respect to the properties of solvent cast composites, it was necessary to stretch and orient them to reinforce them, otherwise the rod-like polymer acted merely as a filler (Husman, Helminiak, Adams, Wiff and Benner); spun fibers needed to be drawn to maximize tensile strength (Hwang, Wiff, Benner and Helminiak); when rod-like poly(p-phenylenequinoxaline) (PPQ) was blended with coil-like nylon, it couldn't be oriented and therefore was not reinforced to the theoretical level (Hwang, Wiff, Helminiak and Adams); and wet drawn films and fibers were uniaxially oriented and strengthened in one direction only (Hwang, Wiff, Verschoore, Price, Helminiak and Adams).

It has now been discovered that in situ polymerization of a precursor of the coil-like polymer containing dissolved high strength (i.e., a tensile modulus above about $0.25 \times 10^6$ psi) rigid rod-like liquid crystalline polymer in the form of liquid crystalline solutions will produce liquid crystalline molecular composites. Moreover, isotropic solutions will produce isotropic molecular composites. These orientations are desirable in many structural applications owing to the three-dimensional property enhancement.

The technique of in situ polymerization of monomeric solvent in the presence of low strength helical liquid crystalline polymers is known, e.g., Tsutsui and Tanaka, J. Polym. Sci. Polym. Lett. Ed., 15, pp. 475-478 (1977); Tsutsui, R. Tanaka and T. Tanaka, J. Polym. Sci. Polym. Lett. Ed., 17, pp. 511-520 (1979); and Tsutsui and Tanaka, J. Polym. Sci. Polym. Lett. Ed., 18, pp. 17-23 (1980). Further reports are given in Tsutsui and Tanaka, Chemistry Letters, pp. 1315-1318 (1976) who produced poly-L-glutamic acid rods with poly(ethylene oxide) chains; Tsutsui and Tanaka, Mol. Cryst. Liq. Cryst. Vol. 56 (Letters) pp. 57-61 (1979), and Tsutsui and Tanaka, Polymer, 1981, Vol. 22, pp. 117-123, who polymerized n-butyl acrylate in the presence of low strength poly(butyl-L-glutamic acid); and Tsutsui and Tanaka, Polymer Communications, 1980, Vol. 21, pp. 1351-2, who subjected poly(butylene-L-glutamate) dissolved in trimethylene glycol dimethacrylate to ultraviolet polymerization to provide films and molded articles for which no mechanical properties were given.

In view of the foregoing, it is new and unexpected now to utilize high strength rigid-rod liquid crystalline polymers in conjunction with the in situ polymerization technique and to find that molecular composites can be prepared for load bearing structural applications. The homogeneous isotropic and homogeneous liquid crystalline molecular composites so produced are new and form the subject matter of the present invention.

SUMMARY OF THE INVENTION

According to the present invention, there are provided polymeric alloys comprising (i) an in situ polymerized flexible coil-like polymer, and (ii) a reinforcing amount of a rigid rod-like liquid crystalline polymer. In preferred such alloys, the modulus and tension properties are isotropic, i.e., the same when measured in any direction.

Also preferred are such polymeric alloys wherein the flexible coil-like polymer is polymerized in situ from a mixture comprising the rigid rod-like liquid crystalline polymer (ii) dissolved in a solvent comprising a monomeric precursor of said coil-like polymer (i), especially those wherein the monomeric precursor is polymerizable by a free-radical addition reaction, and especially preferably when it includes polymerizable vinyl groups. The amount of reinforcing rigid rod-like liquid crystalline polymer (ii) can vary widely, but in preferred alloys it will comprise from about 1 to about 70, and especially from about 10 to about 50 parts by weight per 100 parts by weight combined of flexible coil-like polymer (i) and rigid rod-like liquid crystalline polymer (ii).

In another major aspect, the present invention provides articles of manufacture formed from a polymeric liquid crystalline or isotropic alloy comprising a mixture of (i) an in situ polymerized flexible coil-like polymer, and (ii) a reinforcing amount of a rigid rod-like liquid crystalline polymer. Preferred such articles are those in which the modulus and tension properties are isotropic, and they preferably are in the form of three-dimensional molded articles, films and filaments.

In a third principal aspect, the present invention contemplates a method for preparing a molecular composite comprising the steps of (a) forming a liquid crystalline or isotropic solution of a reinforcing amount of a rigid rod-like liquid crystalline polymer (ii) in a solvent comprising a monomeric precursor of a flexible, coil-like polymer (i), (b) polymerizing said monomeric precursor in situ to form a flexible, coil-like polymer continuous phase reinforced with said liquid crystalline rod-like polymer as said molecular composite having a morphology corresponding to that of said solution, and, thereafter, (c) recovering said molecular composite.

Among the preferred features of this aspect are to carry out polymerization step (b) in a casting mold, and to recover the molecular composite in the form of a molded article or a film.

DETAILED DESCRIPTION OF THE INVENTION

Suitable for use as rigid rod-like reinforcing polymer component (ii) are any of the polymers known to be capable of assuming liquid crystalline morphology, and adapted to dissolve in the particular polymerizable precursor solvent selected.

Preferred are cellulosics, such as cellulose esters and similar derivatives. Other potentially suitable polymers, provided that a solvent meeting the criteria hereinafter set forth is selected are, for example, those described in the above-mentioned references, especially GB No. 2,088,598B, U.S. Pat. Nos. 4,207,407; 4,377,548, etc. Illustratively, such polymers are poly(p-phenylene terephthalamide); copolymers prepared by replacing a phenylene portion of poly(p-phenylene terephthalamide) with 2,6-naphthalene or p,p'-biphenyl; poly(p-benzamide) and its derivatives; aromatic polyesters prepared from a halogenated hydroquinone or a methylhydroquinone and terephthalic acid, and copolymers with 2,6-dihydroxynaphthalene; aromatic pol-Shiff bases prepared from 2-methyl-p-phenylenediamine and terephthaldehyde and copolymers thereof; poly(spiro-2,4-hepta-4,6-diene) and hydrogenated derivatives thereof; poly(terephthaloyl-p-amino-benzoylhydrazide); polymers comprising a straight chain of poly-p-phenylene; poly(p-phenylenebenzobisthiazole); poly(p-phenylenebenzobisoxazole); poly(p-phenylenebenzobisimidazole); cellulose diacetate, cellulose triacetate, and the like. Especially preferred are mixtures thereof, and the like. The molecular weight of the rigid rod-like liquid crystalline polymers can vary over a broad range, but it is preferred to employ those with number average molecular weights (Mn) above 8,000, and especially preferably those in the range of 20,000 to 200,000. The chain length of the rigid polymers will preferably be 50 angstroms, or more.

With respect to selecting a polymerizable solvent for carrying out the present invention, it should be noted that solutions are manipulated so as to prepare a homogeneous isotropic or a homogeneous liquid crystalline molecular composite. Therefore, polymerizable solvents are to be used, e.g., free-radical-polymerizable solvents. One way in which liquid crystalline orientation is obtained is by raising the concentration of the liquid crystalline polymer/solvent solution above the critical concentration required to thermodynamically favor anisotropic orientation. In another way, by raising the temperature, liquid crystallinity found at a given temperature ($T_1$) is destroyed to yield an isotropic solution. Upon rapidly cooling back to $T_1$, the solution can remain isotropic for a number of hours. By using the above techniques, molecular composites of identical composition, varying only in their degree or orientation, are prepared by polymerizing the solvent at $T_1$.

Suitable solvents for such purposes must be strong enough to dissolve the rigid rod-like polymers at high enough concentrations to achieve liquid crystallinity. This is dependent on the nature of the rigid rod-like polymer, the temperature at which the solution is to be used, and the nature of the solvent. The suitability of any particular solvent is readily determined by trial-and-error. For example, the rod-like polymer can be suspended at 10 weight percent in the prospective solvent and after allowing to stand for 12 to 24 hours, complete or incomplete solubility is readily observable. Based on such tests, in general, cellulosics, such as cellulose diacetate will be dissolved by N-vinyl-2pyrrolidinone, and by others, such as acrylic acid; N,N-dimethyl acrylamide; 2-hydroxyethyl acrylate; 2-hydroxyethyl methacrylate, and the like. More highly substituted cellulosics, such as cellulose triacetate, and those of higher molecular weight, are most readily solubilized in the strongest solvents, e.g., N,N-dimethyl acrylamide and N-vinyl-2-pyrrolidinone. Subject to the foregoing solubility criteria, suitable solvents can be selected from vinyl containing monomers, such as, acrylic acid, acrylonitrile, butyl acrylate, N,N-dimethyl acrylamide, ethyl acrylate, 2-hydroxyethyl acrylate, 2-hydroxyethyl methacrylate, methyl acrylate, methyl methacrylate, methyl vinyl ketone, styrene, vinyl acetate, vinylidene chloride, 4-vinyl-pyridine, N-vinyl-2-pyrrolidinone, mixtures of any of the foregoing and the like. Preferred solvents are N-vinyl-2-pyrrolidinone, acrylic acid, N-N-dimethylacrylamide, or a mixture of any of them. Especially preferred is N-vinyl-2-pyrrolidinone. The coil-like polymer preferably has an Mn above 8,000.

A general method of preparing isotropic and liquid crystalline molecular composites according to this invention is as follows: the rod-like polymer and the polymerizable solvent, e.g. 50—50 weight percent are mixed, e.g., in a Brabender mixer for a suitable time, e.g., 30 minutes, and allowed to stand for a period, e.g., 7 days, then centrifuged to eliminate air bubbles. If desired, a catalyst, e.g., benzoyl peroxide, or an ultraviolet light sensitizer, e.g., 2,2-dimethyl-2- phenylacetophenone, e.g., 1 mole percent based on solvent, can be added. The solutions should be kept in the dark until used. To make them isotropic, they can be heated, e.g., to about 70° C. and held for about 30 minutes, then allowed to cool at room temperature. Alternatively, the solution can be diluted to below the critical concentration for liquid crystallinity, as mentioned above. Isotropy can be determined, e.g., via crossed polarized light microscopy. Such solutions when heated and then cooled will remain isotropic for extended periods of time, e.g., 12 hours, more or less, and then they will slowly regain crystallinity. On the other hand, solutions with concentrations below the critical concentration will remain isotropic indefinitely.

For preparing the composites, the monomeric solvents are polymerized to a coil-like flexible state, e.g., thermally, or by free radical catalysis at moderate temperatures, or by ultraviolet light catalysis, or by any other suitable method. Polymerization can take place in a suitable mold, e.g., between glass plates lined with polytetrafluoroethylene.

Homogenity and morphology, i.e., isotropy and/or liquid crystallinity of parts made from the molecular composites of this invention can be determined conventionally by dynamic mechanical analysis, cross polarized light microscopy and the like, and will be exemplified hereinafter.

DESCRIPTION OF THE PREFERRED EMBODIMENTS

The following examples illustrate the present invention, but are not intended to limit the claims in any manner whatsoever.

EXAMPLE 1

Cellulose diacetate (Mn, 56,000, 10.00 g., 50 wt. %), N-vinyl-2-pyrrolidinone (10.00 g., 50 wt. %), and 2,2-dimethoxy-2-phenylacetophenone (1.0 mole-% based on N-vinyl-2-pyrrolidinone) were weighed into a glass vial and allowed to stand for 24 hours. The viscous mixtures were then mixed thoroughly in a mixer for 30 minutes, allowed to stand in the glass vial for 7 days, and then centrifuged for one hour at 12,000 rpm to eliminate air bubbles. The clear, homogeneous liquid crystalline solution was then stored in the dark until used.

A composite was prepared by pressing approximately 20 g. of cellulose diacetate/N-vinyl-2-pyrrolidinone solution between Pyrex ® plates lined with a Teflon ® mold (3"×4"×1/16") and then inserting the plates into a UV chamber for 6 minutes, during which the N-vinyl-2-pyrrolidinone polymerized. There was formed a cellulose diacetate (CDA)/poly(N-vinyl-2-pyrrolidinone) (NV-2-P) (50/50) liquid crystalline composite with a single glass transition temperature (Tg) of 137° C., indicating homogeneous intermixing (alloying) of the two polymers. The characteristic texture of this film observed under crossed polarized light at temperatures of up to 137° C. confirmed the liquid crystallinity of the composite.

EXAMPLE 2

The procedure of Example 1 was repeated, except that the solution was made isotropic prior to polymerization. The cellulose diacetate/N-vinyl-2-pyrrolidinone solution was heated to 70° C. for 30 minutes and then allowed to cool at room temperature. Before it had regained liquid crystallinity, it was polymerized by UV-light in a mold, as in Example 1. The morphology of the rod-shaped polymer in this CDA/NV-2-P (50—50) alloy was confirmed by microscopy to be isotropic.

For comparison purposes, a homopolymer of poly(N-vinyl-2-pyrrolidinone) was prepared identically by the procedure of Example 1 with 1 mole-% of 2,2-dimethoxy-2-phenylacetophenone as the UV-sensitizer, and a film of cellulose diacetate was cast from dioxane. Pieces cut from the films of Examples 1 and 2, and of the respective homopolymers, were subjected to mechanical testing in all directions by conventional ASTM procedures, with results set forth in the Table:

TABLE

| | | Dynamic Mechanical Tests on Alloys of CDA/NV-2-P | | | | |
|---|---|---|---|---|---|---|
| Example | Composition (CDA/NV-2-P) | Rigid-Rod Morphology | Tensile Strength ($\times 10^3$ psi)$^{(a)}$ | Tensile Modulus ($\times 10^6$ psi)$^{(a)}$ | Flexural Modulus ($\times 10^6$ psi)$^{(b)}$ | Tg °C. |
| A* | 0 | — | 2.7 | .27 | .35 | 54 |
| 1 | 50:50 | liquid crystalline | 8.1 | .45 | .43 | 137 |
| 2 | 50:50 | isotropic | 5.8 | .35 | .40 | 137 |
| B* | 100 | isotropic | 5.4 | .30 | .44 | 190 |

*Control
$^{(a)}$ASTM D-638
$^{(b)}$ASTM B-790

The foregoing results demonstrate that the molecular composites according to this invention are homogeneous and mechanically isotropic.

EXAMPLE 3

The procedure of Example 1 was repeated substituting a cellulose diacetate/acrylic acid solution (45:55 w/w%) for the cellulose diacetate/NV-2-P solution. There was obtained an alloy according to this invention comprising a poly(acrylic acid) matrix and a rigid rod-like liquid crystalline cellulose diacetate reinforcement.

EXAMPLE 4

The procedure of Example 1 was repeated substituting a cellulose diacetate/2-hydroxyethyl acrylate solution (50:50 w/w%) for the cellulose diacetate/NV-2-P solution. There was obtained an alloy according to this invention comprising a poly(2-hydroxyethyl acrylate) matrix and a rigid rod-like liquid crystalline cellulose diacetate reinforcement.

EXAMPLE 5

In another aspect of the invention, anisotropic polymeric alloys are provided. Instead of using solutions containing isotropically oriented liquid crystalline domains, uniaxially-oriented liquid crystalline solutions can be employed to prepare such molecular composites.

The procedure of Example 1 is repeated, except that the solution is extruded as a fiber during which the liquid crystalline phase becomes homeotropically-oriented; the fiber is exposed to UV-catalyzed polymerization to produce a molecular composite according to this invention which contains rigid rod-like uniaxially-oriented, liquid crystalline polymer. The modulus and tensile properties are anisotropic.

Because of their isotropic reinforcement, the composites of this invention are of substantial use in load bearing applications. Also demonstrated is the ability of the present invention to prepare both isotropic and liquid crystalline molecular composites. As shown by comparing the data of Examples 1 and 2, enhanced tensile strenghts and moduli are provided when the composites possess liquid crystalline morphology as opposed to isotropic morphology. Improved processability of both isotropic and liquid crystalline composites has also been demostrated, and the possibility of thermal processing is suggested.

The above-mentioned patents and publications are incorporated herein by reference. Obviously, many variations will suggest themselves to those skilled in this art in light of the above, detailed description. For example, instead of using N-vinyl-2-pyrrolidinone, acrylic acid, or 2-hydroxyethyl acrylate as a solvent N,N-dimethylacrylamide can be used. Instead of using cellulose diacetate of Mn 56,000, one of Mn 30,000 can be used. Instead of using cellulose diacetate, cellulose triacetate of Mn 72,000 and Mn 120,000 can be used. Instead of 45 and 50 wt.% solutions of CDA, 40 wt.% solutions can be used. All such obvious variations are within the full intended scope of the appended claims.

What is claimed is:

1. A polymeric liquid crystalline or isotropic alloy comprising a mixture of
   (i) an in situ polymerized flexible coil-like polymer, and
   (ii) a reinforcing amount of a rigid rod-like liquid crystalline polymer.

2. A polymeric alloy as defined in claim 1 in which the modulus and tensile properties are isotropic.

3. A polymeric alloy as defined in claim 1 which is liquid crystalline.

4. A polymeric alloy as defined in claim 1 which is isotropic.

5. A polymeric alloy as defined in claim 1 wherein the flexible coil-like polymer is polymerized in situ from a mixture comprising the rigid rod-like liquid crystalline polymer (ii) dissolved in a solvent comprising monomeric precursor of said coil-like polymer (i).

6. A polymeric alloy as defined in claim 5 wherein said monomeric precursor is polymerizable by a free-radical addition reaction.

7. A polymeric alloy as defined in claim 5 wherein said monomeric precursor includes polymerizable vinyl groups.

8. A polymeric alloy as defined in claim 1 wherein said rod-like polymer (ii) is present in an amount of from about 1 to about 70 parts by weight per 100 parts by weight of (i) and (ii) combined.

9. A polymeric alloy as defined in claim 8 wherein said rod-like polymer (ii) is present in an amount of from about 10 to about 50 parts by weight per 100 parts by weight of (i) and (ii) combined.

10. A polymeric alloy as defined in claim 1 wherein coil-like polymer (i) is selected from in situ polymerized N-vinyl-2-pyrrolidinone, acrylic acid, 2-hydroxyethyl acrylate, or a mixture of any of the foregoing.

11. A polymeric alloy as defined in claim 10 wherein coil-like polymer (i) comprises in situ polymerized N-vinyl-2-pyrrolidinone.

12. A polymeric alloy as defined in claim 1 wherein said rigid rod-like liquid crystalline polymer (ii) is selected from cellulose diacetate, cellulose triacetate, or a mixture of either of the foregoing.

13. A polymeric alloy as defined in claim 12 wherein rigid rod-like liquid crystalline polymer (ii) comprises cellulose diacetate.

14. A polymeric alloy as defined in claim 1 wherein coil-like polymer (i) comprises in situ polymerized N-vinyl-2-pyrrolidinone and said rigid rod-like liquid crystalline polymer (ii) comprises cellulose diacetate.

15. A polymeric alloy as defined in claim 1 in which the modulus and tensile properties are anisotropic.

16. A polymeric alloy as defined in claim 1 which is liquid crystalline and wherein said rigid rod-like liquid crystalline polymer is uniaxially oriented.

17. An article of manufacture formed from a polymeric liquid crystalline or isotropic alloy comprising a mixture of
   (i) an in situ polymerized flexible coil-like polymer, and
   (ii) a reinforcing amount of a rigid rod-like liquid crystalline polymer.

18. An article of manufacture as defined in claim 17 which is three-dimensional and in which the modulus and tensile properties are isotropic.

19. An article of manufacture as defined in claim 17 which is a three-dimensional molded article, film or filament.

20. A method of preparing a molecular composite comprising the steps of:
   (a) forming a liquid crystalline or isotropic solution of a reinforcing amount of a rigid rod-like liquid crystalline polymer (ii) in a solvent comprising a monomeric precursor of a flexible, coil-like polymer (i),
   (b) polymerizing said monomeric precursor in situ to form a flexible, coil-like polymer continuous phase reinforced with said liquid crystalline rod-like polymer as said molecular composite, having a morphology corresponding to that of said solution, and
   (c) recovering said molecular composite.

21. A method as defined in claim 20 including the step of introducing the solution of step (a) into a casting mold in which polymerizing step (b) is carried out.

22. A method as defined in claim 20 wherein said molecular composite is liquid crystalline.

23. A method as defined in claim 20 wherein said molecular composite is isotropic.

24. A method as defined in claim 20 wherein said monomeric precursor is polymerizable by a free-radical addition mechanism.

25. A method as defined in claim 20 wherein the monomeric precursor includes polymerizable vinyl groups.

26. A method as defined in claim 20 wherein the amount of rigid rod-like liquid crystalline polymer (ii) employed in step (a) is sufficient to provide from about 1 to about 70 parts by weight per 100 parts by weight combined of coil-like polymer (i) and rod-like polymer (ii) in said molecular composite.

27. A method as defined in claim 26 wherein the amount of rigid rod-like liquid crystalline polymer (ii) employed in step (a) is sufficient to provide from about 10 to about 50 parts by weight per 100 parts by weight of combined coil-like polymer (i) and rod-like polymer (ii) in said composite.

28. A method as defined in claim 20 wherein the precursor for said coil-like polymer (i) is selected from N-vinyl-2-pyrrolidinone, acrylic acid, 2-hydroxyethyl acrylate or a mixture of any of the foregoing.

29. A method as defined in claim 28 wherein the precursor comprises N-vinyl-2-pyrrolidinone.

30. A method as defined in claim 20 wherein said rigid rod-like liquid crystalline polymer (ii) is selected from cellulose diacetate, cellulose triacetate, or a mixture of either of the foregoing.

31. A method as defined in claim 30 wherein said rigid rod-like liquid crystalline polymer (ii) comprises cellulose diacetate.

32. A method as defined in claim 20 wherein said coil-like polymer (i) comprises poly(N-vinyl-2-pyrrolidinone) and said rigid rod-like liquid crystalline polymer (ii) comprises cellulose diacetate.

33. A method as defined in claim 20 wherein the molecular composite is recovered in the form of a molded article, a film or a filament.

34. A method as defined in claim 20 including the step of forming the recovered molecular composite into a three-dimensional molded article, a film or a filament.

* * * * *